United States Patent

Sasuta

Patent Number: 5,313,653
Date of Patent: May 17, 1994

[54] METHOD FOR A COMMUNICATION UNIT TO MAINTAIN A DATA BASE OF SYSTEM SERVICES

[75] Inventor: Michael D. Sasuta, Mundelein, Ill.

[73] Assignee: Motorola, Inc., Schaumburg, Ill.

[21] Appl. No.: 828,313

[22] Filed: Jan. 30, 1992

[51] Int. Cl.$^5$ .............................................. H04B 7/14
[52] U.S. Cl. ...................................... 455/17; 455/54.2
[58] Field of Search ................ 455/9, 33.1, 53.1, 54.1, 455/54.2, 69, 56.1, 67.1, 33.2, 33.4, 34.1, 185.1, 186.1, 17.0; 379/58, 59, 60

[56] References Cited

U.S. PATENT DOCUMENTS

| | | | |
|---|---|---|---|
| 4,926,495 | 5/1990 | Comroe et al. | 455/54.2 |
| 4,941,203 | 7/1990 | Patsiokas et al. | 455/53.1 |
| 5,054,110 | 10/1991 | Comroe et al. | 379/59 |

FOREIGN PATENT DOCUMENTS

| | | | |
|---|---|---|---|
| 0170135 | 7/1989 | Japan | 455/54.1 |
| 0311635 | 12/1989 | Japan | 455/54.1 |

Primary Examiner—Jin F. Ng
Assistant Examiner—Nguyen Vo
Attorney, Agent, or Firm—Timothy W. Markison

[57] ABSTRACT

A communication unit within a trunked communication system can reduce control channel traffic by maintaining a data base of the communication system services that it can perform. The data base is maintained by the communication unit selecting a service that it desires to perform. Having selected the service, the communication unit verifies that it is one of the services that it can perform and transmits a request to perform that service to a communication resource allocator. The communication resource allocator responds to the request and the communication unit updates its data base based upon the response from the communication resource allocator. The response transmitted by the communication resource allocator may comprise either a grant to the communication unit that allows it to perform the selected service or a denial that the selected service is one that the communication unit is not allowed to perform.

5 Claims, 2 Drawing Sheets

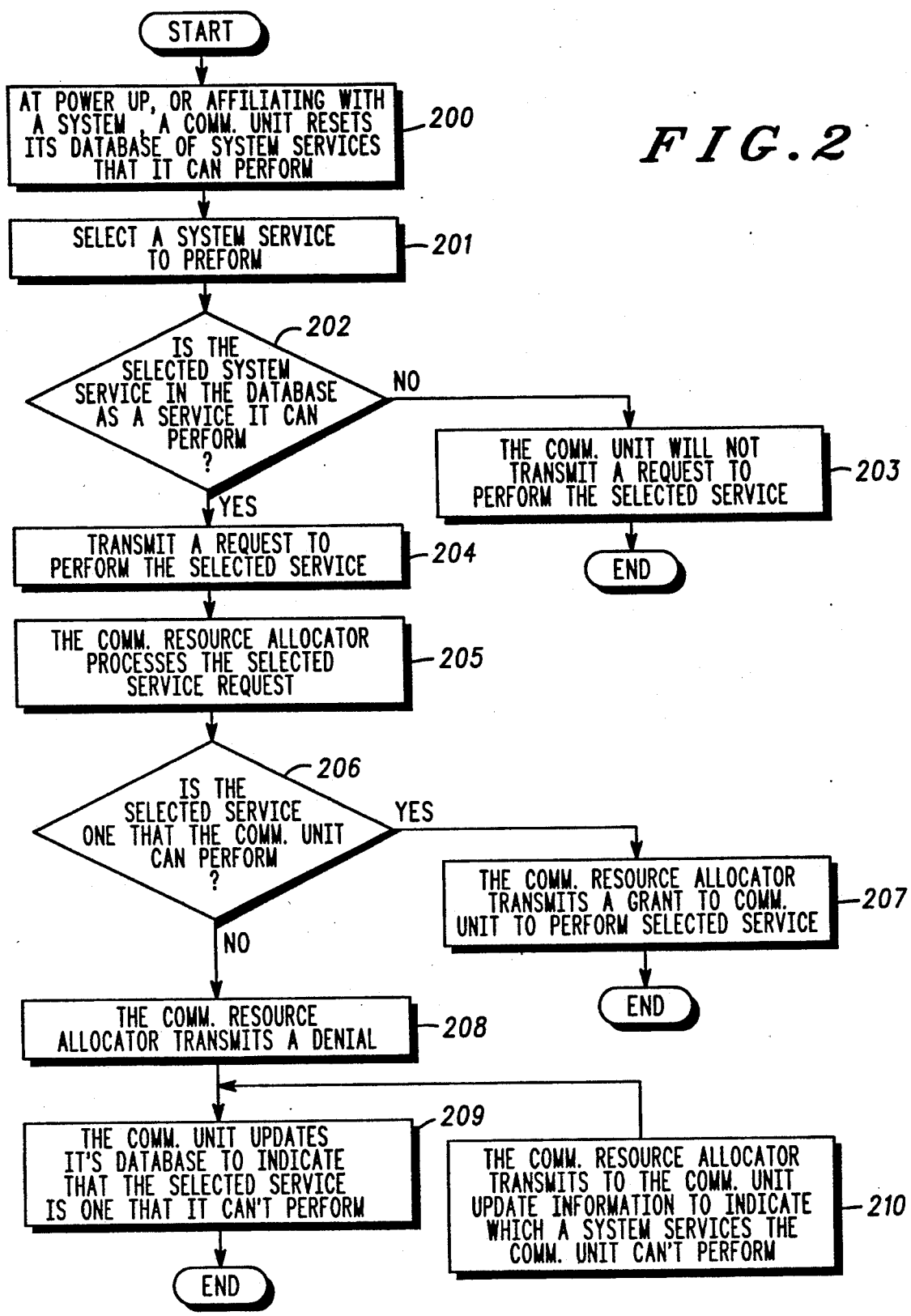

5,313,653

METHOD FOR A COMMUNICATION UNIT TO MAINTAIN A DATA BASE OF SYSTEM SERVICES

FIELD OF THE INVENTION

This invention relates generally to trunking communication systems and in particular to a method that allows a communication unit to maintain a data base of system services that it is capable of performing.

BACKGROUND OF THE INVENTION

Trunked communication systems are known to comprise a plurality of communication units, a limited number of communication resources that are transceived via a predetermined number of repeaters, or base stations, and a communication resource allocator that allocates a limited number of communication resources among the plurality of communication units. The communication resources may comprise a TDM bus, a carrier frequency, a pair of carrier frequencies, or any RF transmission means. Of the communication resources, one is selected to act as a control channel which transceives operational data between the communication resource allocator and the communication units. The communication units, which may be portable radios and/or mobile radios, are arranged into talk groups by commonality of use. For example, a talk group may comprise communications that are operated by a police department while another talk group comprises communication units operated by a fire department.

In addition to basic communications between talk group members, trunking communication systems offer a variety of services that a particular communication unit can subscribe to. For example, a communication unit may subscribe to such services as telephone interconnections, facsimile transmissions, private calling, wide area calling and the like. The communication resource allocator maintains a data base of the systems services that a communication unit has subscribed to. However, the communication unit does not contain such information. Thus, when a communication unit desires to perform a particular function it transmits in a request via a control channel, and once received by the communication resource allocator, the communication resource allocator determines whether that particular communication unit can perform such a service. If the communication unit has not subscribed to that service, the communication resource allocator transmits a denial message to that particular communication unit. This prevents the communication unit from accessing the selected service but does not prevent the communication unit from transmitting the same request at a subsequent time and having to receive the denial message again.

With the communication unit transmitting service requests that will not be granted over and over again, the control channel becomes unnecessarily busy. Therefore, a need exists for a method that will allow a communication unit to maintain a data base of the system services that it can perform such that control channel traffic is reduced.

SUMMARY OF THE INVENTION

This need an others are substantially met by the method for a communication unit to maintain a data base of system services disclosed herein. In a trunked communication system that comprises a plurality of communication units, a limited number of communication resources that are transceived via a predetermined number of repeaters, and a communication resource allocator that allocates a limited number of communication resources among the plurality of communication units, wherein a communication unit has been assigned to perform at least some of the plurality of communication system services, the following is a method that allows a communication unit to reduce control channel traffic by maintaining a data base of the communication services that it can perform. The process begins when a communication unit selects a service of the plurality of communications services. The communication unit verifies from an internal data base that the selected service is one that the communication unit can perform. If the service is one that the communication unit can perform, it transmits a request to perform the selected service to the communication resource allocator. The communication resource allocator responds to the request which it transmits to the communication unit. In addition, the communication unit also updates its data base based on the responses from the communication resource allocator, wherein the response can indicate that the selected service is one that the communication unit is not allowed to perform or granting the request for the selected service.

BRIEF DESCRIPTION OF THE DRAWINGS

FIG. 2 illustrates a logic diagram of an implementation of the present invention.

DESCRIPTION OF A PREFERRED EMBODIMENT

Figure 1:
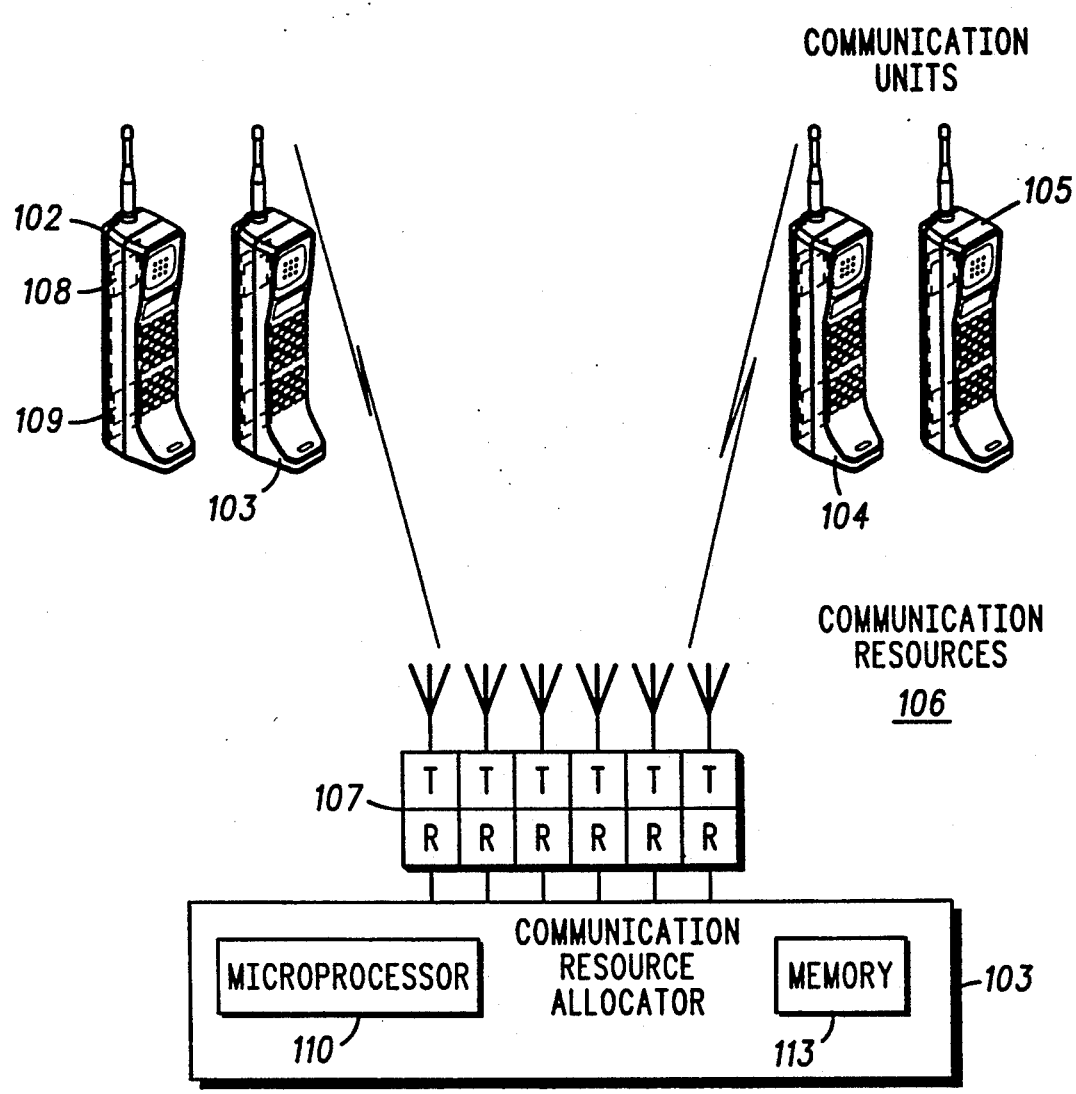
FIG. 1 illustrates a trunked communication system that may incorporate the present invention.

FIG. 1 illustrates a trunking communication system comprising a communication resource allocator 101, a plurality of communication units (four shown) 102-105, a limited number of communication resources 106, and a limited number of repeaters 107. Each of the communication units 102-105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102-105 and the communication resource allocator 101 via the repeaters 107, wherein the repeaters may comprise base stations. One of the communication resources 106 is selected as the control channel which transceives trunking communication system control data between the communication resource allocator and the communication units 102-105.

FIG. 2 illustrates a method that allows a communication unit to reduce control channel traffic related to system services that the communication unit is not currently permitted to access. The communication unit stores the system services available to it in a database which is within the communication unit's memory. The system services database contains entries for each system services that the communication unit can physically access, that is has all the appropriate control programming and hardware to support the system service, such as telephone dialing equipment for telephone interconnect system service. When a communication unit becomes active on a system (i.e. power up by the communication unit user, roams into the coverage area of a useable communication system, etc.), the communication unit sets its system services database entries to the default setting which indicates that the communication unit can access all the system services defined in the system service database 200.

When the communication unit selects a system service to perform 201, the communication unit references its system service database to determine the current status of the selected system service 202. If the selected system service is one that the communication unit is currently not permitted to perform in this communication system, the communication unit will not transmit a request to perform the selected system service to the communication resource allocator 203. The communication unit will present a denied system service indication as the feedback to the communication unit user. This terminates the selected system service operation for this particular request.

If the entry in the system service database associated with this selected system service indicates that this is a service the communication unit is currently permitted to perform on this communication system, the communication unit transmits a request to perform the selected service to the communication resource allocator 204, and awaits a response from the communication resource allocator.

The communication resource allocator recovers the selected system service request transmitted by the communication unit, and determines how the system service request should be processed 204. The communication resource allocator has a system service database which has entries associated with which system services each communication unit is allowed to access and perform on this communication system. The communication resource allocator processes the request by referencing its system service database to determine if the selected service is one that the communication unit is allowed to perform 206. If the selected system service is one that the communication unit is allowed to perform, the communication resource allocator transmits an appropriate system service grant 207 to the requesting communication unit such that the communication unit can process the selected system service. Processing of a system service by a communication unit is known, thus no further discussion will be presented.

If, however, the communication resource allocator determines that the selected system service is one that the communication unit is not allowed to perform, the communication resource allocator, as is known, transmits an appropriate system service denial response to the requesting communication unit. The requesting communication unit, upon recovering the system service denial, terminates the system service request function delivering appropriate system service denial feedback indication to the communication unit user. The communication unit also updates its system service database to indicate that the selected system service is one that the communication unit is currently not allowed to perform in this communication system 209. Subsequent selection of this particular system service by the communication unit will result in a local system service denial processing as described above until the system service database element for this selected system service indicates allowed status.

The above addresses the operations for maintaining the communication unit's system service database based upon communication resource allocator responses to selected system services at the time the selected service is requested. The communication resource allocator can also exercise control of the contents of the communication unit's system service database without the need for the communication unit to attempt to perform a system service. In this mode of operation, the communication resource allocator determines the system services allowed for a particular communication unit based upon some known triggering function (i.e. communication unit first makes its presence known to the communication resource allocator, the communication resource allocator resident system service database elements associated with this communication unit are changed with respect to the last update of system service status to the communication unit, etc.). The communication resource allocator then accesses the control channel and transmits update information to the communication unit indicating which system services the communication unit is permitted and not permitted to perform on this communication system 210. The communication unit recovers the update information and updates the appropriate system service elements of its system service database 209.

The above describes a method that enables a communication unit to locally determine when a selected system service is not to be performed within a communication system and in so doing the communication unit may eliminate any system service request transactions upon the system control channel thereby reducing the control channel activity associated with system service denial operations.

I claim:

1. In a trunking communication system that comprises a plurality of communication units, a limited number of communication resources that are transceived via a predetermined number of repeaters, and a communication resource allocator that allocates the limited number of communication resources among the plurality of communication units, wherein a communication unit of the plurality of communication units has been assigned to perform at least some of a plurality of communication system services, a method for the communication unit to reduce control channel traffic by maintaining a database of communication system services that it can perform, the method comprises the steps of:

a) selecting a service of the plurality of communication services to produce a selected service;

b) verifying, from the database, that the selected service is one that the communication unit can perform;

c) transmitting a request to perform the selected service when the selected service has been verified that it is one that the communication unit can perform, otherwise, the request to perform the selected service is not transmitted;

d) receiving, from the communication resource allocator, a response to the request to perform the selected service; and e) updating the database based upon the response from the communication resource allocator.

2. The method of claim 1 further comprises setting the database to all services allowed when the communication unit is first powered up or when the communication unit changes affiliation to another communication system.

3. The method of claim 1 further comprises updating the database based upon a new service message from the communication resource allocator.

4. In the method of claim 1, the response in step (e) further comprises informing the communication unit that it is not allowed to perform the selected service or that the communication unit's performance of the selected service is limited.

5. In a trunking communication system that comprises a plurality of communication units, a limited number of communication resources that are transceived via a predetermined number of repeaters, and a communication resource allocator that allocates the limited number of communication resources among the plurality of communication units, wherein a communication unit of the plurality of communication units has been assigned to perform at least some of a plurality of communication system services, a method for the communication resource allocator to reduce control channel traffic by interfacing with the plurality of communication units such that each communication unit of the plurality of communication units maintains a database of communication system services it can perform, the method comprises the steps of:

a) receiving a request to perform a selected service by a communication unit;

b) determining that the communication unit is allowed to perform the selected service;

c) transmitting a response to the communication unit based upon the determination made in step (b); and d) transmitting a new service message to the communication unit when the communication unit is assigned a new service or a change in allowed services occurs.

* * * * *